No. 864,518. PATENTED AUG. 27, 1907.
A. B. CRUICKSHANK.
HEAT DISTRIBUTER FOR COOKING UTENSILS.
APPLICATION FILED AUG. 25, 1906.
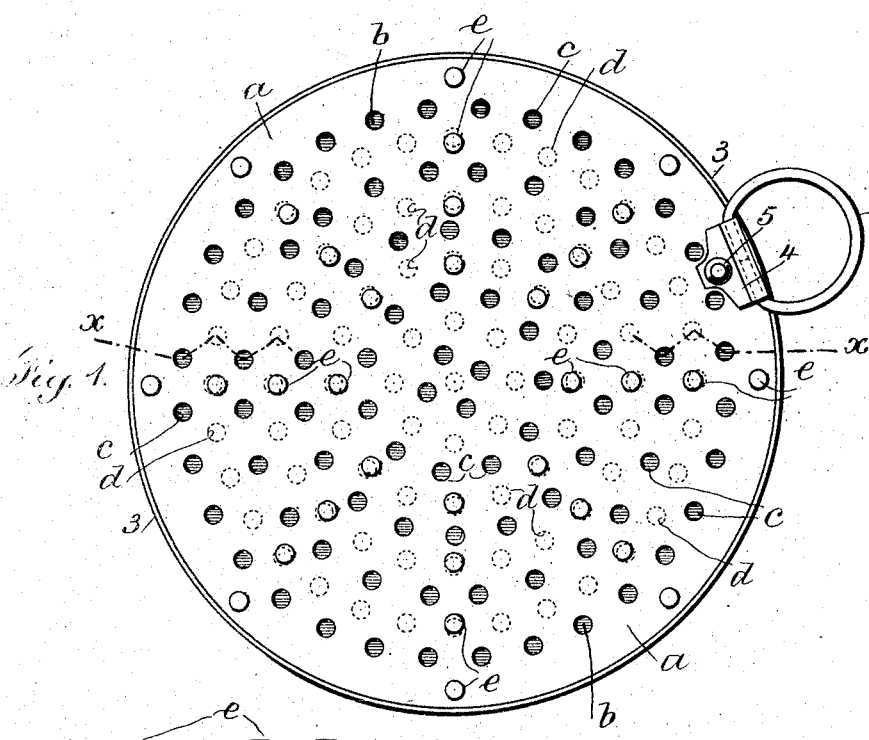

UNITED STATES PATENT OFFICE.

ARTHUR B. CRUICKSHANK, OF LONDON, ENGLAND, ASSIGNOR OF ONE-HALF TO HIMSELF AND ONE-HALF TO FRANK L. TAINTER, OF LONDON, ENGLAND.

HEAT-DISTRIBUTER FOR COOKING UTENSILS.

No. 864,518.   Specification of Letters Patent.   Patented Aug. 27, 1907.

Application filed August 25, 1906. Serial No. 331,985.

*To all whom it may concern:*

Be it known that I, ARTHUR B. CRUICKSHANK, a subject of the King of Great Britain, residing in London, England, have invented an Improvement in Heat-Distributers for Cooking Utensils, of which the following is a specification.

My present invention relates to a heat distributing device to be used with cooking utensils.

Heretofore in cooking and preparing food in pots, saucepans, stew-pans and like vessels, the material therein contained has been liable to adhere to the bottom of the vessel and then to become burned due largely to the direct contact of the sides and bottom of the vessel with the fire or flame employed, which also if too intense may cause the contents of the vessel to boil over.

Now the object of my invention is to overcome these difficulties by providing a heat distributer adapted to intervene between a vessel used for cooking purposes and the fire or flame employed and so constructed that direct heat cannot come in contact with the sides or bottom of a vessel but is distributed evenly over the entire extent of these surfaces, whereby the food is cooked uniformly throughout and burning of the same is prevented, and furthermore, this is accomplished without resorting to a constant stirring of the material being cooked.

In carrying out my invention, I preferably employ a plurality of plates made of sheet metal or other similar material and each provided with series of apertures so placed that when the parts are assembled the said apertures in one plate are out of line with or do not register with those in the next adjacent plate, means for securing the said plates together and means for supporting a cooking utensil above the top plate, as hereinafter more particularly described.

In the drawing, Figure 1 is a plan view of my improved heat distributer, Fig. 2 is a section on line *x*, *x*, of Fig. 1, Fig. 3 is a partial section illustrating the modified form of my invention and Fig. 4 is an elevation of the heat distributer illustrating the use of the same with an auxiliary frame shown as broken away for using the heat distributer as will be hereinafter described.

*a*, *b*, designate flat plates which may conveniently be made of sheet metal or other similar material and circular in outline as illustrated, or of other configuration as circumstances may require.

The plate *a* is provided at its periphery with an overturned annular flange 2 preferably integral therewith and at its periphery the plate *b* is provided with a similar annular flanges 3; the plate *a* with its annular flange 2 being of such dimensions as to fit tightly within the annular flange 3 of the plate *b*, by which means the said plates are secured together. It will be manifest however, that other means to this end may be employed without departing from the nature of my invention.

The plate *a* is provided with a series of holes or apertures indicated at *c*. Preferably these apertures *c* are arranged in concentric circles and are equally spaced apart. Similarly the plate *b* is provided with a series of holes or apertures indicated at *d*, which with the exception of the central aperture are also arranged in concentric circles and equally spaced apart; holes *c* in the plate *a* and holes *d* in the plate *b* being so situated that they are staggered in their relationship to one another, that is to say, the holes in one plate are not in line with those in the other when the said plates are secured together. The upper plate *a* may also be provided with a series of pins or projections *e* preferably arranged in radial lines as illustrated, and adapted to support a vessel in which food is to be cooked. I also employ, as illustrated, a ring *f* pivotally connected to a strap 4 which is riveted at 5 to the upper plate *a*; the ring *f* being employed to conveniently handle the heat distributer and also as a means for supporting the same when not in use.

As indicated in Fig. 2, my improved heat distributer is preferably of such a diameter as to fit within the opening in the top 6 of a stove or range normally covered by a stove lid. As shown in Fig. 3, I may employ an intermediate plate *g*. In this instance the holes or apertures in the exterior plates are preferably placed in similar positions, while the holes *h* in the intermediate plate *g* are placed in positions intermediate of those in the exterior plates *a*, *b*.

In some instances, such for instance as making toast or where it is required to boil a material very slowly, it may be necessary to employ an auxiliary stand indicated at 7 of Fig. 4; this stand being preferably cylindrical and provided with a base 8 and a top flange 9 adapted to receive the heat distributer in order to place the same at a greater distance from the fire or flame employed in cooking.

It will be manifest from the construction of the article hereinbefore described, that the flames or heated air from the fire must first pass through the apertures in the lower plate and be reflected by striking the upper plate before passing through the apertures in the same to reach the bottom of the vessel in which food is to be prepared, and that by thus regulating the heat an even distribution of the same is obtained.

I claim as my invention:

1. A heat distributer for cooking utensils, comprising two parallel spaced apart plates of similar outline and each provided with series of apertures and means for securing said plates together at their peripheries in their spaced apart relation so as to form a chamber entirely inclosed between the said plates and the said means.

2. A heat distributer for cooking utensils, comprising two spaced apart plates of similar outline, each of which is provided with a series of apertures so placed that the said apertures in one plate are out of line with those in the other plate, means for securing the said plates together and means for supporting a cooking utensil above the top plate.

3. A heat distributer for cooking utensils, comprising a top plate, an annular flange integral with the same, a bottom plate and an annular flange integral with the said bottom plate and adapted to receive the said annular flange of the top plate so that said plates occupy a parallel relation, and said plates being provided with a series of apertures so placed that those in one plate are out of line with those in the other plate.

4. A heat distributer for cooking utensils, comprising a top plate, an annular flange integral with the same, a bottom plate, an annular flange integral with the said bottom plate and adapted to receive the said annular flange of the top plate so that said plates occupy a parallel relation, and said plates being provided with a series of apertures so placed that those in one plate are out of line with those in the other plate and means for supporting a cooking utensil above the said top plate.

5. A heat distributer for cooking utensils, comprising a top plate, an annular flange integral with the same, a bottom plate, an annular flange integral with the said bottom plate and adapted to receive the said annular flange of the top plate so that said plates occupy a parallel relation, and said plates being provided with a series of apertures so placed that those in one plate are out of line with those in the other plate and a series of pins secured in radial positions in said top plate and adapted to support a cooking utensil thereon.

Signed by me this 9th day of August 1906.

ARTHUR B. CRUICKSHANK.

Witnesses:
A. NUTTING,
R. F. WILLIAMS.